(12) United States Patent
Shapira et al.

(10) Patent No.: US 12,273,500 B2
(45) Date of Patent: Apr. 8, 2025

(54) METHODS AND APPARATUS TO CALIBRATE AND/OR VALIDATE STEREOSCOPIC DEPTH SENSING SYSTEMS

(71) Applicant: Intel Corporation, Santa Clara, CA (US)

(72) Inventors: Yuval P. Shapira, Yokne'am Ilit (IL); Shir Paluch-Siegler, Haifa (IL)

(73) Assignee: Intel Corporation, Santa Clara, CA (US)

( * ) Notice: Subject to any disclaimer, the term of this patent is extended or adjusted under 35 U.S.C. 154(b) by 850 days.

(21) Appl. No.: 17/212,498

(22) Filed: Mar. 25, 2021

(65) Prior Publication Data

US 2021/0211635 A1    Jul. 8, 2021

(51) Int. Cl.
*H04N 13/246*     (2018.01)
*G02B 30/22*      (2020.01)
*G06T 7/579*      (2017.01)
*G06T 7/80*       (2017.01)

(52) U.S. Cl.
CPC .......... *H04N 13/246* (2018.05); *G02B 30/22* (2020.01); *G06T 7/579* (2017.01); *G06T 7/85* (2017.01)

(58) Field of Classification Search
CPC ......... H04N 13/246; G06T 7/579; G06T 7/85; G02B 30/22
See application file for complete search history.

(56) References Cited

U.S. PATENT DOCUMENTS

| | | | | |
|---|---|---|---|---|
| 2008/0278574 | A1* | 11/2008 | Ramstad | H04N 13/334 348/51 |
| 2013/0063572 | A1* | 3/2013 | Ramachandra | H04N 13/122 348/47 |

\* cited by examiner

*Primary Examiner* — On S Mung
(74) *Attorney, Agent, or Firm* — Hanley, Flight & Zimmerman, LLC

(57) ABSTRACT

Methods and apparatus to calibrate and/or validate stereoscopic depth sensing systems are disclosed. An example apparatus includes an image generator to generate a first image for a first image sensor; and generate a second image for a second image sensor. First content in the first image is to be shifted relative to corresponding second content in the second image by a shift amount. The shift amount based on a target depth to be tested. The example apparatus further includes a calibration controller to cause the first and second images to be presented on the display screen; and calibrate the first and second image sensors based on a difference between the target depth and a measured depth. The measured depth based on an analysis of the first and second images as captured by the first and second image sensors when the first and second images are presented on the display screen.

25 Claims, 8 Drawing Sheets

METHODS AND APPARATUS TO CALIBRATE AND/OR VALIDATE STEREOSCOPIC DEPTH SENSING SYSTEMS

FIELD OF THE DISCLOSURE

This disclosure relates generally to depth sensing, and, more particularly, to methods and apparatus to calibrate and/or validate stereoscopic depth sensing systems.

BACKGROUND

Stereoscopic cameras are camera systems that include at least two image sensors spaced apart from each other to capture two different perspectives of a scene. By comparing differences in images captured by each of the image sensors, it is possible to generate depth information about the subject matter in the scene captured in the images. However, the accuracy of depth information depends upon how well the image sensors have been calibrated.

Figure 1:
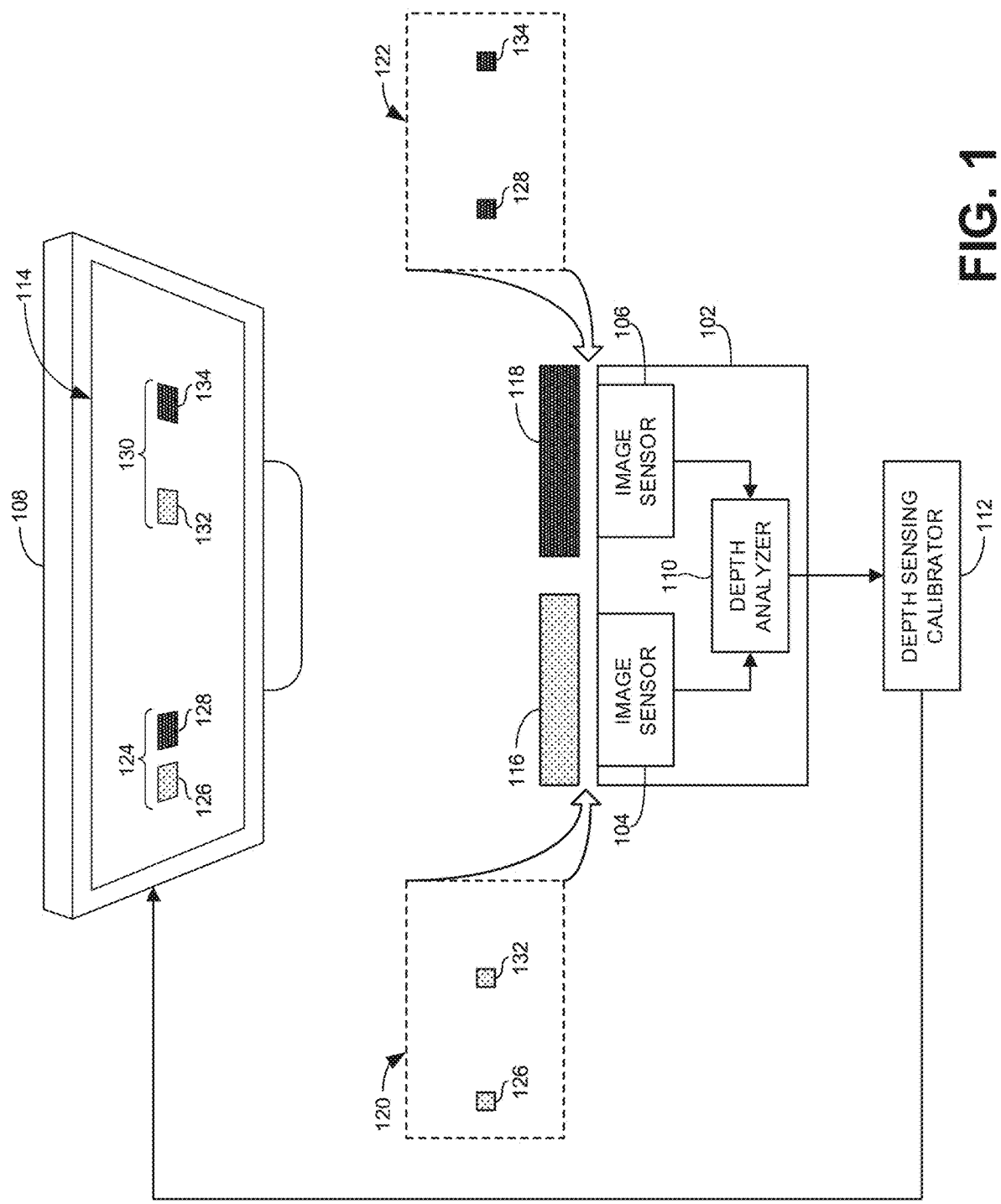
FIG. 1 illustrates an example environment in which teachings disclosed herein may be implemented.

The figures are not necessarily to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Calibrating image sensors for use in stereoscopic depth sensing typically involves placing multiple targets at different locations within a physical environment. More particularly, the targets are positioned at known positions (e.g., known depths and known viewing angles) relative to the image sensors. Alternatively, the targets contain features of a known physical size, such as checker boards, serving as the sole ground truth for the calibration. The image sensors capture images of the environment including the targets. The resulting images are analyzed to compare the locations of the targets as they appear in the captured images relative to the known positions of the targets in the real world environment to adjust and/or validate the calibration of the image sensors.

The accuracy of image sensor testing and calibration increases as the number of different viewing angles and depths for different targets are used increases. However, testing targets at more viewing angles increases costs to perform such calibrations because it requires more time to reposition the targets for each additional position to be tested and/or more space to support adding additional differently positioned targets. Further, conventional approaches to test and calibrate stereoscopic image sensors are often performed in a room of a testing facility with a limited size (e.g., often less than 5 m$^2$), thereby limiting the maximum possible depth at which a target may be placed. What is more, placing targets at farther depths and/or spaced apart at wider viewing angles is becoming of greater importance as the range and field-of-view of image sensors continues to increase as technology advances. Thus, many existing test facilities are no longer adequate to calibrate and validate image sensors to their full capabilities.

Furthermore, existing approaches to calibrate and/or validate stereoscopic image sensors are difficult to implement in-field by entities other than the original manufacturers. That is, while original design manufacturers may have a dedicated testing facility to calibrate image sensors when first manufactures, other entities may not have such facilities available. It is not uncommon for products containing stereoscopic image sensors to experience a drop or impact that cause the image sensors to become misaligned. Even small misalignments can significantly impact the accuracy of the sensors, thereby creating a need for recalibration. As a result, entities other than original manufacturers are constrained to choose between incurring the significant expense of installing cumbersome setups that enable on-site recalibration of sensors or to accept the shortened useful life of the misaligned sensors and replace them with new (calibrated) sensors. Such entities may seek to strike a balance between these two alternatives by using simplified and limited calibration targets that only partially fix the calibration parameters but are unable to achieve the quality of calibration at the time of original manufacture.

Examples disclosed herein improve the coverage and fidelity of validation of stereoscopic depth sensing systems and improve the quality of calibration and key performance indicators (KPIs) of such systems relative to existing approaches at significantly reduced costs with significantly reduced space requirements. Further, examples disclosed herein provide a methodology for high-quality in-field recalibration of depth sensing systems capable of returning such systems to their original KPIs after being misaligned or otherwise altered based on an impact or other circumstance.

In particular, examples disclosed herein generate images for presentation on a display screen that may be placed within the field of view of stereoscopic image sensors. The images presented on the display screen include virtual targets that mimic physical targets placed in a real world environment in conventional stereoscopic. More particularly, in some examples, a virtual target for a pair of stereoscopic image sensors is generated with a pair of complementary targets in the images presented on the display screen. Different ones of the complementary targets are generated for different ones of the image sensors and positioned at different locations on the display screen so that, from the perspectives of the separate image sensors, the complementary targets resolve to a single point at a particular depth associated with the virtual target. Different depths are achieved by adjusting the distance between the targets associated with a complementary pair. Thus, even though the display screen may be relatively close to the image sensors (e.g., within 0.5 m), a virtual target can be created at any suitable depth well beyond the distance of the display screen (and well beyond the limited depths possible in many existing testing facilities, e.g. 5 m and more). Furthermore, different viewing angles for different targets may be achieved simply by placing the complementary targets at different locations on the display screen. In some examples, the generation of multiple different complex virtual targets at any desired viewing angle and at any desired depth, sequentially or simultaneously, can be generated without space constraints (beyond or within the space between the image sensors and the display screen) and without the need to mechanically move any components to position (and/or reposition) targets that would be required if using physical targets in the real world.

FIG. 1 illustrates an example environment 100 in which teachings disclosed herein may be implemented. In this example, a stereoscopic sensing system 102 with two separate image sensors 104, 106 is positioned in front of a display screen 108. As used herein, an "image sensor" is an image sensing system (e.g., a camera) that includes both (1) an imager or sensor (e.g., a CCD sensor, a CMOS sensor) that captures and converts light waves into electric signals and (2) one or more optical elements (e.g., a lens) to direct and/or focus the light waves for capture by the imager. In this examples, the stereoscopic sensing system 102 is a self-contained stereoscopic camera with an on-board depth analyzer 110 incorporated into the unit. In other examples, the first image sensor 104, the second image sensor 106, and/or the depth analyzer 110 may be implemented as separate, discrete components. For examples, the image sensors 104, 106 may be distinct cameras that are supported in a structural frame and in communication with a separate computing device that implements the depth analyzer 110.

In the illustrated example of FIG. 1, the display screen 108 is a standalone monitor (e.g., a television monitor, a computer monitor, etc.) driven by a depth sensing calibrator 112. In other examples, the display screen may be any suitable surface onto which an image is projected by a projector (driven by the depth sensing calibrator 112). In other examples, the display screen 108 may be a computing device (e.g., a laptop computer, a desktop computer, a tablet, etc.). In some such examples, the depth sensing calibrator 112 may be implemented by the display screen 108 (e.g., as a computing device). In other examples, the depth sensing calibrator 112 may be implemented in a computing device that also includes the depth sensing system 102. In some such examples, the depth analyzer 110 and the depth sensing calibrator 112 may be integrated and/or implemented as a single component.

The example depth sensing calibrator 112 generates pairs of stereoscopic images (also referred to herein as stereo images for short) for presentation on the display screen 108 that are to be captured by the first and second image sensors 104, 106. Each image in a pair of stereo images includes similar content except that the content is shifted by some amount in one image relative to the other. More particularly, each of the stereo images in the pair is generated for a particular one of the image sensors 104, 106 based on a known spatial relationship between the particular image sensor 104, 106 and the display screen 108. The differences (e.g., shift in visual content) between the two stereo images arises from the fact that the spatial relationship of each image sensor 104, 106 to the display screen 108 is slightly different due to the distance between the sensors 104, 106.

In some examples, the depth sensing calibrator 112 synthesizes a pair of stereo images into a single composite image 114 as represented in FIG. 1. Producing a composite image 114 that contains the separate stereo image intended for each image sensor 104, 106 enables both images to be presented on the display screen 108 simultaneously. In some such examples, the content of the composite image 114 corresponding to either of the stereo images intended for one of the image sensors 104, 106 is distinguishable and may be isolated from the content corresponding to the other stereo image through the use of a filter. For example, the content associated with a first one of the pair of images included in the composite image 114 may be generated in red while the second image is generated in blue. As a result, if the composite image 114 is viewed through a red filter, only the content associated with the first image (generated in red) will be visible because the red filter will block out the second image (generated in blue). Conversely, if the composite image 114 is viewed through a blue filter, only the content associated with the second image (generated in blue) will be visible because the blue filter will block out the first image (generated in red).

This particular arrangement is represented in the illustrated example of FIG. 1 in which the color red is represented with light stippling and the color blue is represented with dark stippling. Specifically, a first optical filter 116 (e.g., a red filter) is positioned in front of the first image sensor 104 and a different, second optical filter 118 (e.g., a blue filter) is positioned in front of the second image sensor 106. As a result, the first image sensor 104 is only able to capture the content corresponding to a first image 120 (e.g., generated in red) included in the composite image 114. Conversely, the second image sensor 106 is only able to capture the content corresponding to a second image 122 (e.g., generated in blue) included in the composite image 114. In some examples, the red content in the first image 120 will not appear red from the perspective of the first image sensor 104, and the blue content in the second image 122 will not appear blue from the perspective of the second image sensor 104 because the image sensors 104, 106 are monochrome sensors which acquire a grey scale image in which the intensity reflects the amount of collected light, regardless of the wavelength (e.g., color) of the content. However this procedure can be done for any color sensor as well by applying a white balance procedure to convert the color image into a balanced grey scale image. However, for purposes of explanation, the light and dark stippling representative of the red and blue content is included in the first and second images 120, 122 of FIG. 1. While the above example is described with respect to the colors red and blue, in other examples, different colors may be used. In some examples, the content for each image 120, 122 that is synthesized and combined into the composite image 113 presented on the display screen 108 is generated in a particular color by limiting each image to a particular color channel of the display screen 108.

In some examples, the images 120, 122 may be distinguished (e.g., filtered out with respect to the other) using other properties of light than color. For instance, in some examples, the content for the first image 120 is generated using a first polarization channel and the content for the second image 122 is generated using second polarization channel different than the first polarization channel (e.g., orthogonal polarization). In such examples, the filters 116, 118 are polarizing filters (rather than color filters). A device capable of imposing different polarization states to different pixels (for use as the display screen 108 in such examples) can be a television screen with a passive 3D feature.

In other examples, the images 120, 122 may be distinguish in other manners that do not depend on the properties of light. For instance, in some examples, the images 120, 122 are separated temporally. That is, in some examples, the images are presented on the display screen 108 in sequential order in a manner that is synchronized with the image sensors 104, 106 capturing an image of the display screen 108 at the corresponding time when the particular image intended for each particular image sensor 104, 106 is on the display.

As mentioned above, the content in both stereo images 120, 122 is similar except that the content is shifted in one image relative to the other. The shifting of the content enables corresponding points in each of the images 120, 122 to resolve to a single point from the perspectives of the two image sensors 104, 106 viewing the corresponding image 120, 122. Further, the amount of shift in the corresponding content determines the depth or distance at which the resolved single point appears in a three-dimensional (3D) virtual space when the images 120, 122 are analyzed by the depth analyzer 110. Accordingly, in some examples, the content included in the pairs of images generated by the depth sensing calibrator 112 for presentation on the display screen 108 includes complementary pairs of targets to be captured by the image sensors 104, 106 that are positioned to correspond to a virtual target at a specified depth in 3D virtual space.

For instance, in the illustrated example of FIG. 1, a first pair 124 of complementary targets 126, 128 is presented on the left side of the composite image 114 and a second pair 130 of complementary targets 132, 134 is presented on the right side of the composite image 114. As used herein, two targets presented on the display screen 108 are complementary when they are intended to resolve to a single virtual target in 3D virtual space based on the different perspectives of the two image sensors 104, 106. To have the complementary targets resolve to a single virtual target, each complementary target in a corresponding pair corresponds to a different one of the separate stereo images 120, 122. Thus, in the illustrated example, the leftmost target 126, 132 in each complementary pair 124, 130 corresponds to the first image 120 intended to be viewed from the perspective of the first image sensor 104. Similarly, the rightmost target 128, 134 in each complementary pair 124, 130 corresponds to the second image 122 intended to be viewed from the perspective of the second image sensor 106.

Figure 2:
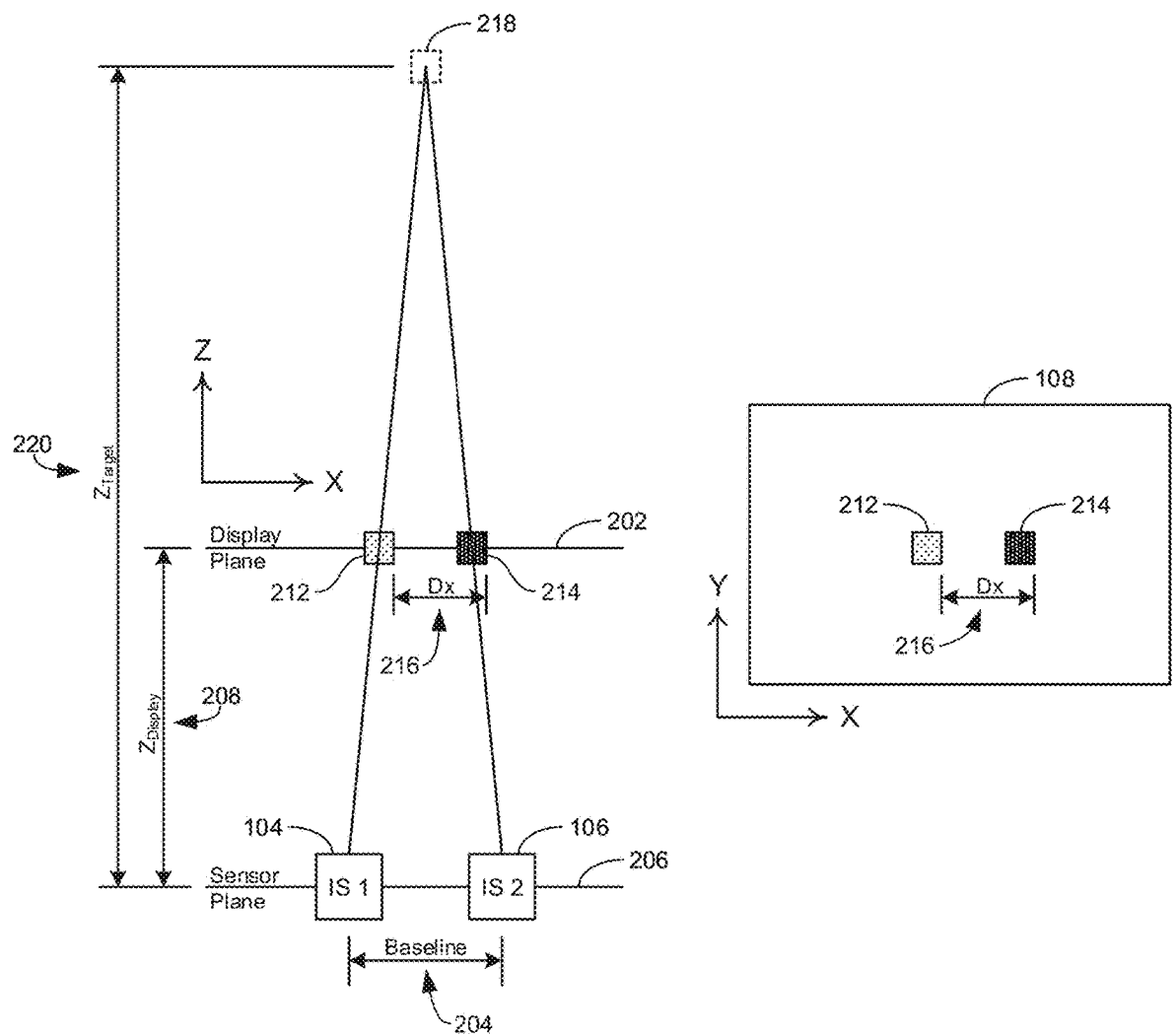
FIG. 2 illustrates the formation of a virtual target based on two complementary targets presented on a display screen.

As shown in the illustrated example, the first pair 124 of complementary targets 126, 128 are closer together than the second pair 124 of complementary targets 132, 134. As a result, the first pair 124 of complementary targets 126, 128 will resolve to a virtual target in 3D virtual space that is at a different distance or depth than a virtual target associated with the second pair 124 of complementary targets 126, 128. This is demonstrated with reference to FIG. 2. In particular, FIG. 2 shows the first and second image sensors 104, 106 relative to display plane 202 corresponding to the display screen 108 in the XZ plane where the Z axis extends into the display screen 108 and the XY plane is defined by the display plane 202. As represented in FIG. 2, the image sensors 104, 106 are spaced apart by a baseline distance 204 along a sensor plane 206 that is separated from the display plane 202 by a display distance ($Z_{Display}$) 208. In this example, two complementary targets 212, 214 are presented on the display screen 108 with the first target 212 intended for the first image sensor 104 and the second target 214 intended for the second image sensor 106. In this example, the two targets 212, 214 are shifted apart along the X axis by a shift amount (Dx) 216. Based on the particular shift amount 216 between the complementary targets 212, 214 and the corresponding perspectives of the two image sensors 104, 106, the complementary targets 212, 214 resolve to a single virtual target 218 that is a virtual target distance or target depth ($Z_{Target}$) 220 from the sensor plane 206 that is beyond the display distance 208.

FIG. 2 represents an ideal scenario in which the image sensors 104, 106 and the display screen 108 are oriented perfectly level with the X axis, the image sensors 104, 106 are perfectly aligned along the sensor plane 206, and the sensor plane 206 is perfectly parallel with the display plane 202. In this idealized scenario, the relationship between the shift amount (Dx) 216 and the virtual target distance ($Z_{Target}$) 220 can be expressed mathematically as follows:

$$Dx = \text{Baseline} \times \left(1 - \frac{Z_{Display}}{Z_{Target}}\right) \quad \text{Eq. 1}$$

Thus, as the virtual target distance ($Z_{Target}$) 220 increases to a farther depth beyond the display plane 202, the shift amount (Dx) 216 between the complementary targets 212, 214 also increases. Thus, with reference to the illustrated example of FIG. 1, the virtual target corresponding to the first pair 124 of complementary targets 126, 128 would be identified at a virtual distance that is closer than the virtual target corresponding to the second pair 130 of complementary targets 132, 134 because of the larger shift between the second pair 130 of complementary targets 132, 134. It is possible to create a virtual target 218 at a virtual distance 220 that is less than the display distance 208 by placing the complementary targets on the opposite sides of each other from what is shown in the illustrated example of FIG. 2. That is, as the virtual target distance 220 decreases, the shift amount 216 between complementary targets 212, 214 also decreases until the virtual target distance 220 equals the display distance 202 (at which point the shift amount 216 equals zero). As the virtual target distance 220 continues to decrease to less than the display distance, the shift distance 216 begins to increase (but in the negative or opposite direction). Thus, the image sensors 104, 106 can be calibrated with respect to a target at any virtual distance by generating suitable stereo images (e.g., the images 120, 122) with complementary targets shifted the appropriate amount as defined by the desired virtual distance to be tested.

Similar equations to Equation 1 outlined above may be defined for non-idealized scenarios (e.g., where the image sensors 104, 106 and/or the display screen 108 are angled relative to the X axis, the image sensors are misaligned along the sensor plane 206, the sensor plane is not parallel with the display plane, etc.) using basic trigonometric relationships so long as the particular spatial relationship of the image sensors 104, 106 and the display screen 108 are known or can otherwise be determined. Accordingly, in some examples, the display screen 108 and the image sensors 104, 106 are mechanically fixed at known locations so that the position and orientation (e.g., pose) of the display screen 108 relative to each of the image sensors 104, 106 can be specified. Additionally or alternatively, in some examples, the depth sensing calibrator 112 provides an alignment image for presentation on the display screen 108 that is then captured by the image sensors 104, 106 to calculate or derive the position and orientation of the display screen 108 relative to each of the image sensors 104, 106.

In the illustrated example of FIGS. 1 and 2, the complementary targets 126, 128, 132, 134, 212, 214 are represented as small squares in otherwise blank image(s). However, the targets may have any suitable shape and be of any suitable size. Further, in some examples, the targets may be overlaid onto a non-blank background containing any type of text, images, icons, and/or other content. In some examples, the images generated by the depth sensing calibrator 112 represent complex (real-world or computer generated) 3D environments. For instance, the images may correspond to photographs of a real-world scene. In some examples, the targets may correspond to particular components or features in the 3D environment represented by the images.

Some stereoscopic sensing systems (e.g., active stereovision cameras) include a projector that projects a pattern of light onto the scene for which depth sensing is to be performed to facilitate, among other things, the recognition of depth at different points along planar surfaces in the scene. Accordingly, in some examples, an image of the projection pattern associated with the stereoscopic sensing system 102 (e.g., captured by an external camera) is combined or merged with the images 120, 122 presented on the display screen 108. That is, in some examples, the composite image 114 includes the projection pattern as well as the particular complementary targets. In some such examples, the projection pattern is overlaid on top of the complementary targets with the projection pattern being warped or shifted in a similar manner to the shifting of the respective targets to create the perception that the pattern is being projected on to a target at the virtual target distance. As a result, the internal processing of the depth analyzer 110 can process the images displayed on the display screen 108 in substantially real-time as captured by the image sensors 104, 106 in the same manner as if the depth analyzer 110 were processing actual images of a real-world environment to generate depth information.

The depth analyzer 110 of some existing stereoscopic cameras are designed to generate depth information based on image data generated simultaneously by both image sensors 104, 106. For this reason, the first and second images 120, 122 generated by the depth sensing calibrator 112 and intended for respective ones of the image sensors 104, 106 are synthesized into the composite image 114 as described above. However, in other examples, where the depth analyzer 110 is able to generate depth information based on image data captured at different points in time, the depth sensing calibrator 112 may cause the separate images 120, 122 to be presented at different points in time without merging them into a single composite image 114. Additionally or alternatively, even where the depth analyzer 110 is not designed to analyze separate images captured at different points in time, the above process may be accomplished by capturing the temporal spaced images by the separate image sensors 104, 106 and providing the captured images to a separate image analyzer (e.g., associated with the depth sensing calibrator 112) to perform the depth sensing analysis. In examples where the separate images 120, 122 are distinguished based on a temporal spacing, there is no need for the images to be limited to a particular color channel and/or particular polarization channel.

Figure 3:
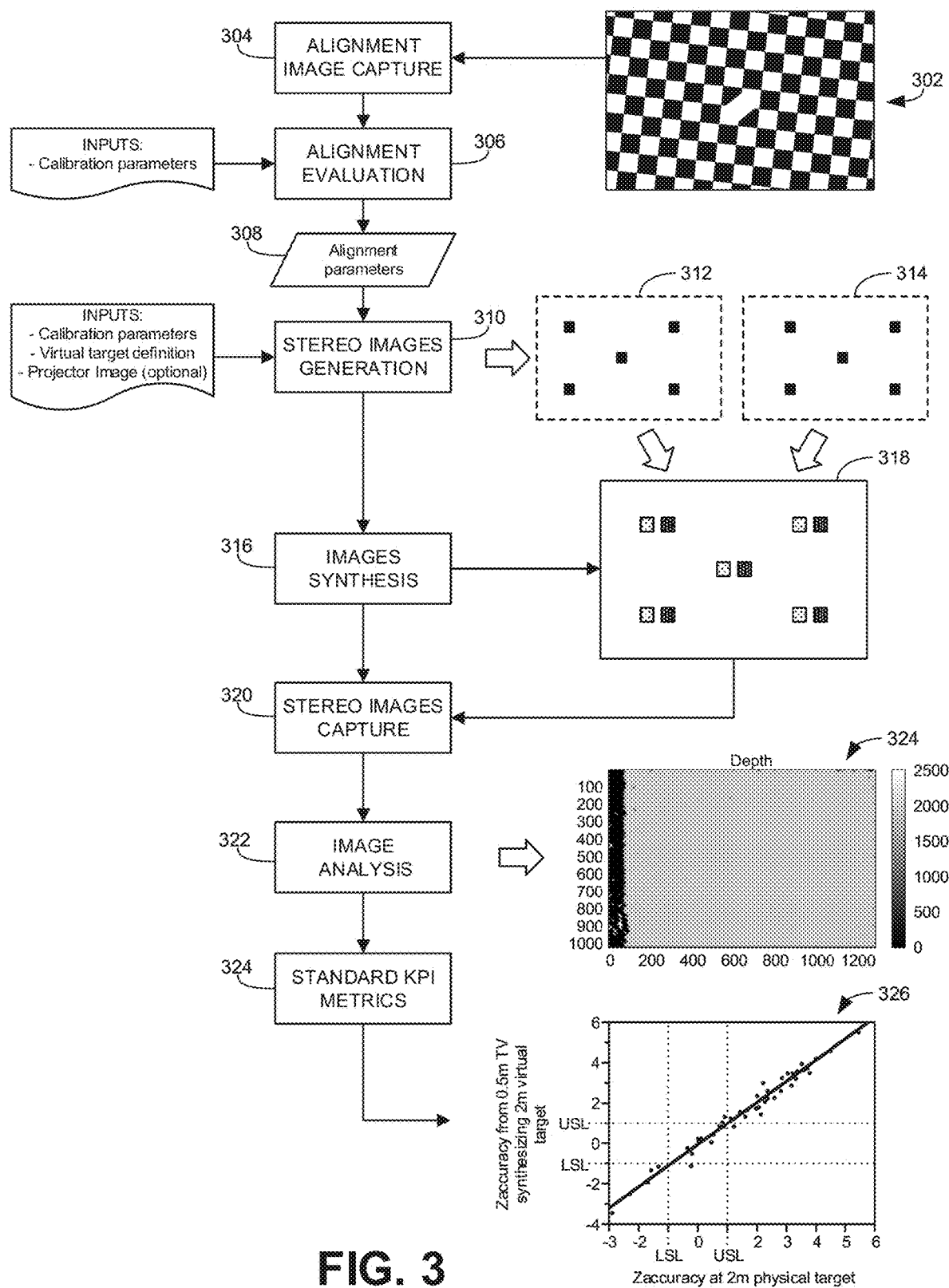
FIG. 3 illustrates an overall process flow for implementing teachings disclosed herein.

FIG. 3 illustrates an overall process flow for implementing teachings disclosed herein. As discussed above, the position and orientation of the display screen 108 relative to the image sensors 104, 106 needs to be determined to properly determine where complementary targets are to be generated for presentation on the display to produce a virtual target at a specified virtual target distance. Accordingly, in some examples, the depth sensing calibrator 112 provides an alignment image 302 for presentation on the display screen 108. In this example, the alignment image 302 is a checkerboard. However, any other suitable alignment image 302 may additionally or alternatively be used. The image sensors 104, 106 capture (block 304) the alignment image 302 while being presented on the display screen 108. In some examples, one of the image sensors 104, 106 captures the displayed alignment image 302. In other examples, both of the image sensors 104, 106 separate capture the displayed alignment image 302. The capture image(s) are provided to the depth sensing calibrator 112 to evaluate the alignment (block 306) of the image sensors 104, 106 relative to the display screen. In some examples, this is accomplished by performing calculated based on a perspective-n-point problem using any suitable number of points identified in the checkerboard alignment image 302. The results of this process produces alignment parameters 308 defining the position and orientation (e.g., pose) of the display screen 108 relative to the image sensors 104, 106. In some examples, separate alignment parameters 308 may be defined for each of the image sensors 104, 106. In some examples, the process of determining of the alignment parameters 308 based on the alignment image 302 may be omitted if the spatial relationship of the display screen 108 and the image sensors 104, 106 is otherwise mechanically verified (e.g., the components are mounted to a fixed support structure that maintains the spatial relationships of the components at known values).

Once the alignment parameters 308 are determined, the depth sensing calibrator 112 generates stereo images (block 310) for presentation on the display screen 108. A separate stereo image 312, 314 is generated for each image sensor with one or more targets that has a complementary target in the other stereo image. The location of the targets within the images and the shift amount between respective pairs of the complementary targets are determined based on virtual target definitions specifying the particular viewing angles and associated depths for the virtual targets to be tested. In some examples, the virtual target definitions are represented in an array of vertices with a separate {x, z, z} triplet defined for each virtual target to be tested. However, the virtual target definitions may be specified in any other suitable way.

In some examples, once the individual stereo images 312, 314 are generated, the depth sensing calibrator 112 synthesizes the images (block 314) to produce a composite image 316 the is provided to the display screen 108 for presentation. In this particular example, the composite image 318 includes five pairs of complementary targets to resolve to five different virtual targets. In this example, each of the pairs of complementary targets are shifted by the same amount such that each of the virtual targets will appear to be at the same depth (e.g., all the virtual targets will appear on the same virtual plane from the viewing angle of the image sensors 104, 106). Thus, in this example, a single viewing angle for a single depth is tested. In other examples, different ones of the targets may correspond to different depths and/or different viewing angles (e.g., corresponding to virtual planes tilted relative to the plane of the display screen 108).

In the illustrated example, the content (e.g., the targets) in the separate stereo images 312, 314 is the same except shifted in one image relative to another. That is, in this example, the individual images 312, 314 generated before image synthesis are not limited by color or polarization. Rather, the process of synthesizing the images 312, 314 to form the composite image 318 includes using orthogonal polarization and/or different color channels to maintain separation of the content corresponding to each of the initial stereo images 312, 314 once merged into the composite image 318.

Figure 4:
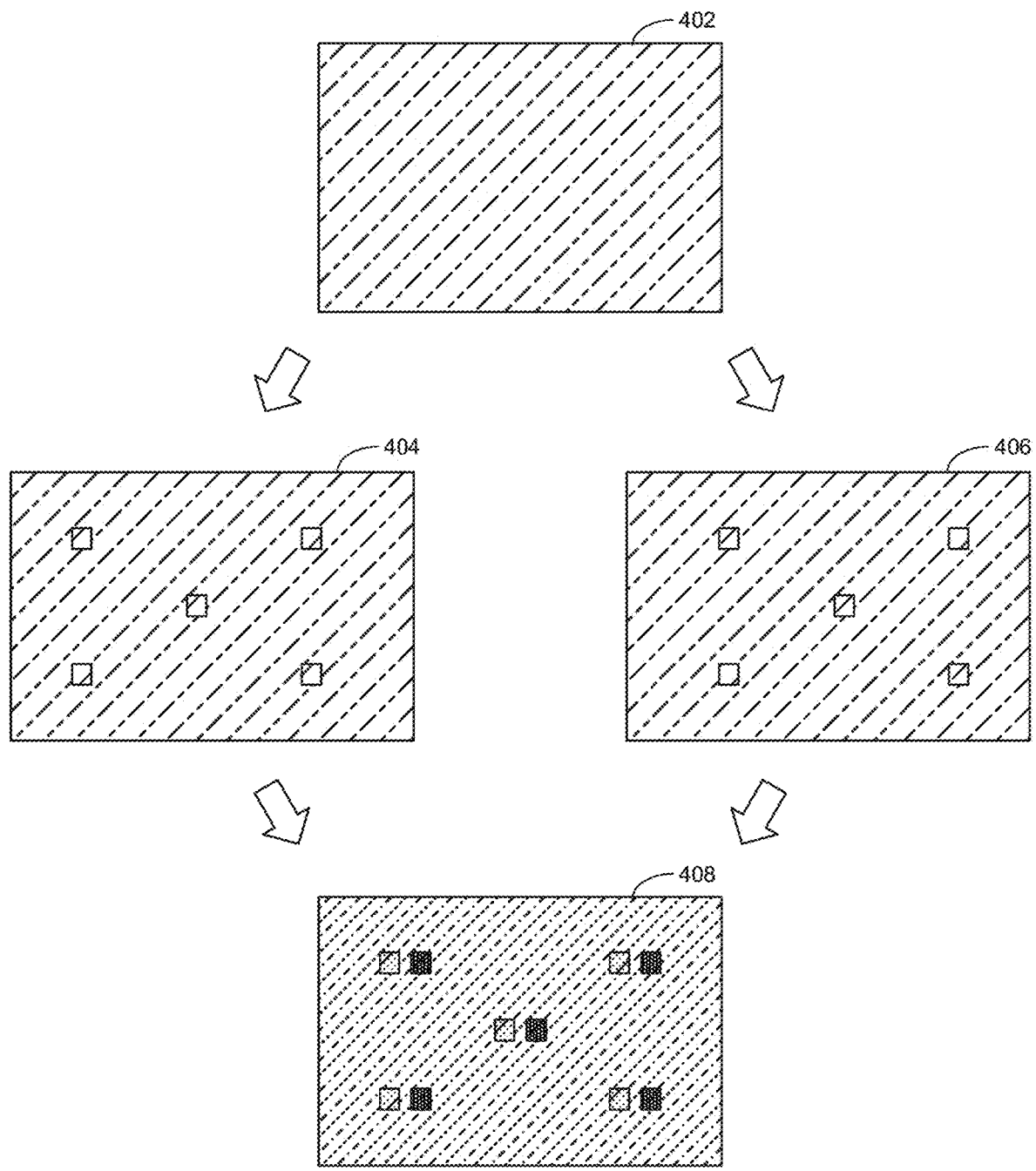
FIG. 4 illustrates an example process flow to form a composite image based on two stereo images and a projection pattern.

In some examples, where the depth sensing system uses a projected pattern (e.g., an active stereovision camera), the stereo images generated (block 310) and subsequently synthesized (block 316) may include an image of the projected pattern as shown in FIG. 4. Specifically, in some examples, an image of a projected pattern 402 may be stored in memory for use in generating the stereo images. In some examples, the projected pattern 402 corresponds to the actual pattern projected by the depth sensing system. However, the projected pattern 402 may be any suitable pattern projects light onto surfaces in an environment to be imaged for depth sensing. In some examples, the image of the projected pattern 402 is obtained by capturing an image (e.g., with one of the image sensors 104, 106 and/or an external camera) of the pattern when projected onto the surface of the display screen 108 (or other surface at a similar distance to the display screen 108). As represented in FIG. 4, beginning with the image of the projected pattern 402, individual complementary targets are added to generate corresponding first and second stereo images 404, 406 intended for respective ones of the first and second image sensors 104, 106. In some examples, the portion of the projected pattern 402 corresponding to the locations of the complementary targets in the stereo images 404, 406 are warped or shifted in accordance with the designated virtual distances or depths for the corresponding virtual targets. Similar to the process described above, the separate stereo images 404, 406 are then synthesized to form a composite image 408. For purposes of explanation, the composite image 408 in FIG. 4 includes two different projected patterns to represent that the projected pattern 402 used in one of the images 404, 406 is preserved as distinguishable from the pattern as used in the other image 404, 406 (based on polarization or coloration).

Returning to FIG. 3, once generated, the composite image 318 is provided to the display screen 108 for presentation to the image sensors 104, 106. The image sensors 104, 106 capture images (block 320 of the composite image 318 as viewed through optical filters that isolate the content (e.g., either the first or the second stereo image 312, 314) intended for each image sensor. This has the same effect as if the image sensors 104, 106 were capture simultaneous images of physical targets in the real-world at the locations and depths corresponding to the virtual targets. As a result, the depth analyzer 110 can analyze the images (block 322) captured by the image sensors 104, 160 to generate depth information represented by the images. In some examples, the depth information is represented by a depth map 324 that assigns a value representative of a depth for pair of complementary pixels in the two stereo images. The example depth map 320 indicates a consistent depth across the entire span of the images (the dark left edge corresponds to an edge of one of the stereo images that includes content not represented in the other stereo image due to the amount of shift in the content between the two stereo images). Additionally or alternatively, in some examples, the depth information generated by the depth analyzer 110 includes a point cloud (which may or may not include color information) and/or a polygon mesh.

The depth sensing calibrator 112 evaluates the depth information generated by the depth analyzer 110 for accuracy using standard KPI metrics (block 326). As an example, the graph 326 shown in FIG. 3 shows a comparison of actual depth information obtained from physical targets placed at a distance of 2 meters from a depth sensing system relative to virtual targets at the same virtual distance created on a display screen 0.5 meters from the depth sensing system. As can be seen, the accuracy of the two approaches is in strong agreement, therefore, establishing the viability of the methodology disclosed herein. Furthermore, the results obtained using the virtual targets was accomplished in a space approximately $\frac{1}{64}^{th}$ the volume used for the physical targets.

Independent of a comparison to depth measurements generated using physical targets, the depth sensing calibrator 112 may determine the accuracy of the depth sensing system by comparing the depth information generated for the virtual targets captured by the image sensors 104, 106 in the images 312, 314 (e.g., measured depth information) relative to the depths defined in the virtual depth definitions for the corresponding virtual targets (e.g., target depth information). If there is a match (e.g., within a threshold), the depth sensing calibrator 112 determines that the image sensing system is accurate. If there is a discrepancy or error in the output depth information relative to the input depth information, the depth sensing calibrator 112 determines that the image sensing system is inaccurate and, therefore, needs calibration. Accordingly, in some examples, the depth sensing calibrator 112 generates updated calibration parameters. The depth sensing calibrator 112 may provide updated calibration parameters to the image sensing system for recalibration. That is, the calibration parameters define adjusted values for the intrinsic parameters of the image sensors 104, 106.

Once the image sensors 104, 160 have been recalibrated (e.g., their intrinsic and/or extrinsic parameters have been adjusted), the process may be repeated by generating new stereo images to retest the system and confirm whether the calibration was successful (e.g., reduced error in the output to less than a threshold). New stereo images need to be generated (rather than using the previous generated stereo images 314, 314) because the particular location of the complementary targets within the stereo images is determined based on assumed values for the intrinsic parameters of the image sensors 104, 106. Inasmuch as the calibration process involves adjusting the intrinsic and/or extrinsic parameters of the image sensors 104, 106, the location of the targets in the previously generated stereo images are no longer valid. Thus, in some examples, the calibration process involves iteratively testing the stereo images generated based on current values for the depth sensing system parameters and then adjusting those parameters based on any error until the error reduces to a threshold and the calibration process converges to an accurate output corresponding to the tested input.

Figure 5:
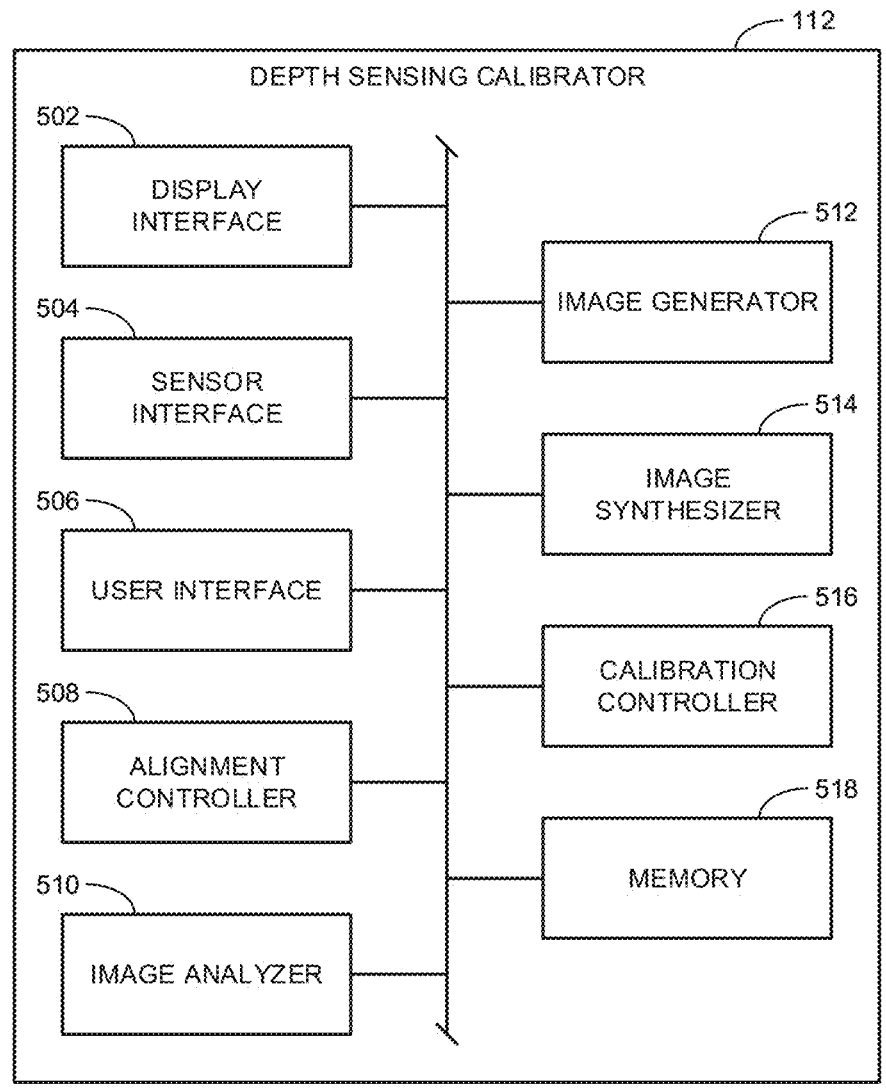
FIG. 5 is a block diagram illustrating an example implementation of the example depth sensing calibrator of FIG. 1.

FIG. 5 is a block diagram illustrating an example implementation of the depth sensing calibrator 112 of FIG. 1. As shown in the illustrated example, the depth sensing calibrator 112 includes an example display interface 502, an example sensor interface 504, an example user interface 506, an example alignment controller 508, an example image analyzer 510, an example image generator 512, an example image synthesizer 514, an example calibration controller 516, and example memory 518.

The example depth sensing calibrator 112 of FIG. 1 includes the example display interface 502 to communicate with and/or otherwise interact with the display screen 108. Thus, the depth sensing calibrator 112 is able to provide an alignment image (e.g., the alignment image 302), stereo images (e.g., the stereo images 120, 122, 312, 314, 404, 406), and/or composite images (e.g., the composite images 114, 318, 408) to the display screen 108 for presentation. In some examples, one or more of the alignment image, the stereo images, and/or the composite images are stored in the example memory 518.

The example depth sensing calibrator 112 of FIG. 1 includes the example sensor interface 504 to communicate with and/or otherwise interact with the depth sensing system 102 and/or more particularly the image sensors 104, 106 and/or the depth analyzer 110. In some examples, the sensor interface 504 provides commands to the image sensors 104, 106 to cause the image sensors 104, 106 to capture images and/or to provide such captured images to the depth sensing calibrator. Further, in some examples, the sensor interface 504 causes and/or requests the depth analyzer 110 to provide depth information generated based on images captured by the image sensors 104, 106.

The example depth sensing calibrator 112 of FIG. 1 includes the example user interface 506 to enable interactions with a user to, for example, receive user inputs defining particular depths and/or viewing angles for virtual targets to be tested. In some examples, a user may provide alignment parameters defining the position and orientation of the display screen 108 relative to the image sensors 104, 106 (based on a particular mechanical setup of the system). In some examples, such alignment parameters may be stored in the example memory 518.

The example depth sensing calibrator 112 of FIG. 1 includes the example alignment controller 508 to control the operations involved in determining alignment parameters defining the spatial relationship between the display screen 108 and the image sensors 104, 108. More particularly, the example alignment controller 508 directs the display interface 502 to provide the alignment image to the display screen 108 for presentation when needed to determine alignment parameters. Further, in some examples, the alignment controller 508 directs the sensor interface 502 to cause the image sensors 104, 106 to capture images of the alignment image as presented on the display screen 108.

The example depth sensing calibrator 112 of FIG. 1 includes the example image analyzer 510 to analyze images captured by the image sensors 104, 106 of the alignment image presented on the display screen 108. More particularly, in some examples, the image analyzer 510 performs perspective-n-point calculations to determine the alignment parameters. Such alignment parameters may be stored in the example memory 518. Additionally or alternatively, the image analyzer 510 may perform the same functionality as the depth analyzer 110 of FIG. 1. That is, in some examples the image analyzer 510 analyzes images captured by the image sensors 104, 106 to generate depth information (e.g., a depth map) indicative of the distance of content represented in the images being analyzed. In some examples, the image analyzer 510 corresponds to and/or is implemented in combination with the depth analyzer 110. In other examples, the image analyzer 510 is a separate component to the depth analyzer 110.

The example depth sensing calibrator 112 of FIG. 1 includes the example image generator 512 to generate stereo images based on defined depths and viewing angles for virtual targets. In some examples, the image generator 512 generates a separate stereo image intended for each of the image sensors 104, 106 with complementary targets in each of the stereo images at locations that should (if the sensors are properly calibrated) resolve to a single virtual target at the defined viewing angle and depth when captured by the image sensors 104, 106. In some examples, the image generator 512 adds an image of a projected pattern (e.g., the projected pattern 402) to the stereo images. In some such examples, the image generator 512 warps or alters the projected pattern at the locations of the of the complementary targets.

The example depth sensing calibrator 112 of FIG. 1 includes the example image synthesizer 514 to combine or merge the separate stereo images into a single composite image. In some examples, image synthesizer modifies the content associated with each of the separate stereo images so that the content from each image is distinguishable using orthogonal polarization, different color channels, and/or in any other suitable manner.

The example depth sensing calibrator 112 of FIG. 1 includes the example calibration controller 516 to control the operations involved in testing and calibrating (or recalibrating) the image sensors 104, 106. More particular, the example calibration controller 516 directs the image generator 512 to generate the stereo images and the image synthesizer 514 to synthesize the images as outlined above. Further, in some examples, the calibration controller 516 directs the display interface 502 to provide the composite image to the display screen 108 for presentation. In some examples, the alignment controller 508 directs the sensor interface 502 to cause the image sensors 104, 106 to capture images of the composite image as presented on the display screen 108 and further causes the depth analyzer 110 to generate depth information (e.g., a depth map) based on the captured images. In some examples, where the separate stereo images are to be temporally separated, the calibration controller 516 controls the timing of the presentation of each of the images and the corresponding timing at which the intended image sensor 104, 160 for each image captures the image as it is presented on the display screen 108. Inasmuch as the images are not being captured simultaneously, the depth analyzer 110 may not be able to perform substantially real-time analysis on the images to generate the depth information. Accordingly, in some such examples, the calibration controller 516 may direct the image analyzer 510 to perform post-processing on the captured images to generate the depth information. In some examples, the depth information as generated by the depth analyzer 110 and/or the image analyzer 510 is stored in the memory.

In some examples, the calibration controller 516 determines an error in the depth information output by the depth analyzer 110 and/or the image analyzer 510 by comparing it to the depths defined for the virtual targets included in the stereo images analyzed to generate the output depth information. If the calibration controller 516 determines that an error (e.g., the difference between the input depth values and the output depths values) satisfy (e.g., exceed) an error threshold, the calibration controller 516 determines updated calibration parameters for the image sensors 104, 106 based on the error. In some examples, the updated calibration parameters are stored in memory. Further, the updated calibration parameters may be provided to the depth sensing system 102 via the sensor interface 504. Thereafter, the calibration controller 516 may cause new stereo images to be generated to iterate through the process to confirm whether the updated calibration parameters produce an accurate output (e.g., the error is less than the error threshold).

While an example manner of implementing the depth sensing calibrator 112 of FIG. 1 is illustrated in FIG. 5, one or more of the elements, processes and/or devices illustrated in FIG. 5 may be combined, divided, re-arranged, omitted, eliminated and/or implemented in any other way. Further, the example display interface 502, the example sensor interface 504, the example user interface 506, the example alignment controller 508, the example image analyzer 510, the example image generator 512, the example image synthesizer 514, the example calibration controller 516, and example memory 518 and/or, more generally, the example depth sensing calibrator 112 of FIG. 1 may be implemented by hardware, software, firmware and/or any combination of hardware, software and/or firmware. Thus, for example, any of the example display interface 502, the example sensor interface 504, the example user interface 506, the example alignment controller 508, the example image analyzer 510, the example image generator 512, the example image synthesizer 514, the example calibration controller 516, and example memory 518 and/or, more generally, the example depth sensing calibrator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example display interface 502, the example sensor interface 504, the example user interface 506, the example alignment controller 508, the example image analyzer 510, the example image generator 512, the example image synthesizer 514, the example calibration controller 516, and/or example memory 518 is/are hereby expressly defined to include a non-transitory computer readable storage device or storage disk such as a memory, a digital versatile disk (DVD), a compact disk (CD), a Blu-ray disk, etc. including the software and/or firmware. Further still, the example depth sensing calibrator 112 of FIG. 1 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
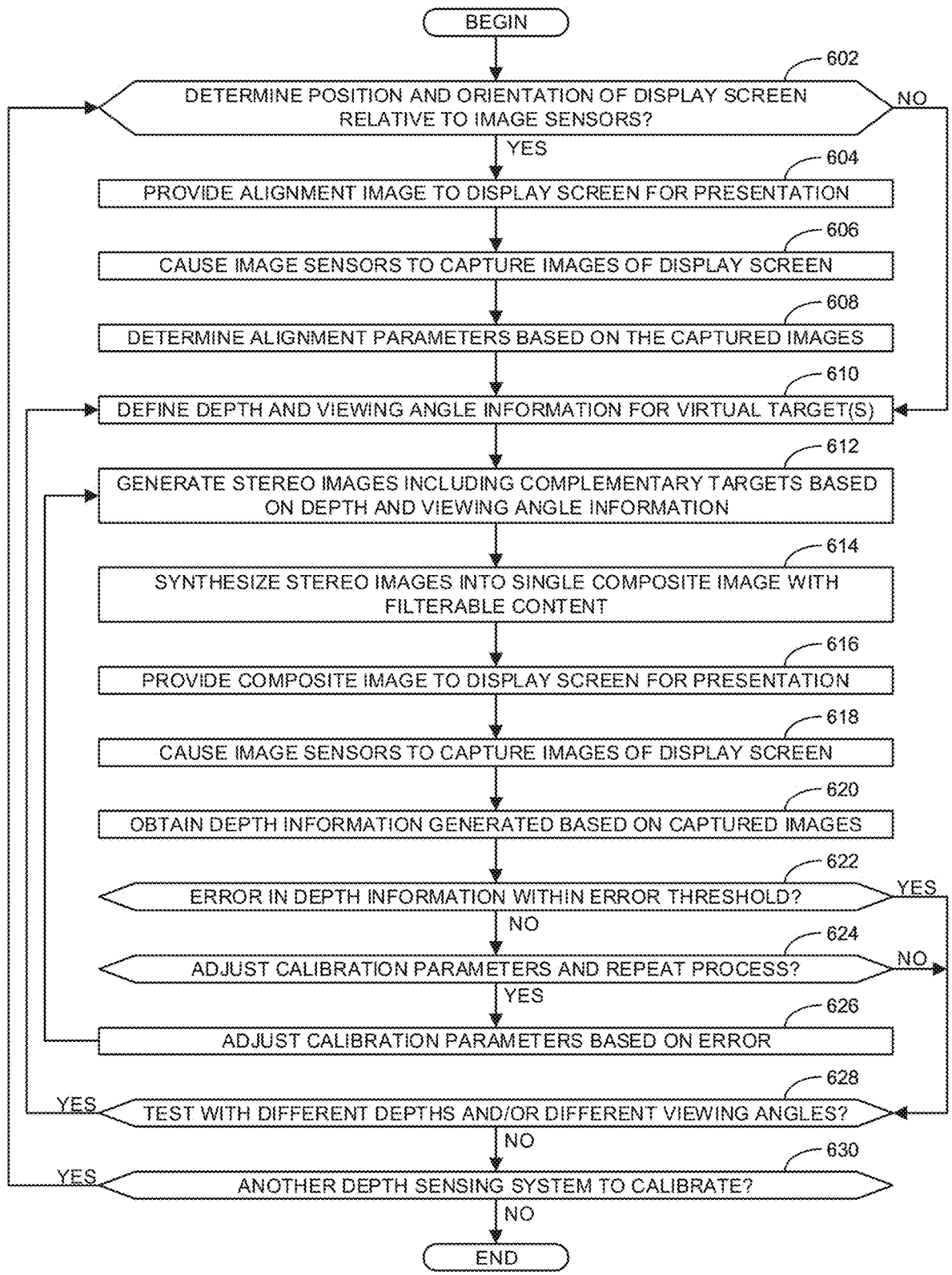
FIG. 6 is a flowchart representative of example machine readable instructions which may be executed to implement the example depth sensing calibrator of FIGS. 1 and/or 5.

A flowchart representative of example hardware logic, machine readable instructions, hardware implemented state machines, and/or any combination thereof for implementing the depth sensing calibrator 112 of FIGS. 1 and/or 5 is shown in FIG. 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example depth sensing calibrator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 6 begins at block 602 where the example alignment controller 508 determines whether the position and orientation of the display screen 108 relative to the image sensors 104, 106 is to be determined. If so, control advances to block 604, where the example display interface 502 provides an alignment image to the display screen 108 for presentation. At block 606, the alignment controller 508 causes the image sensors 104, 106 to capture images of the display screen. At block 608, the example image analyzer 510 determines alignment parameters based on the captured images. In this example, the alignment parameters define the position and orientation of the display screen relative to the image sensors 104, 106. Thereafter, control advances to block 610. Returning to block 602, if the position and orientation of the display screen 108 relative to the image sensors 104, 106 does not need to be determined (e.g., it is defined based on a mechanical setup of the system), control advances directly to block 610.

At block 610, the example calibration controller 516 defines depths and viewing angle information for virtual target(s) to be tested. In some examples, the depths are based on values input by a user via the user interface 506. The depths may be any depths desired to be tested without constraint to the physical space in the real-world in which the test is being implemented. Further, the angles to be tested can be any desired angles within the constraints of the size of the display screen 108 and its distance from the image sensors 104, 106. Further, if view angles outside of the display screen 108 are desired (e.g., for wide-angle image sensors 104, 106), this can be resolved by moving the display screen relative to the image sensors to be located at the desired viewing angle to be tested. Thus, there is virtually no limited to the depths and/or viewing angles that may be tested in accordance with teachings disclosed herein.

At block 612, the example image generator 512 generates stereo images including complementary targets based on the depth and viewing angle information. At block 614, the example image synthesizer 614 synthesizes the stereo images into a single composite image with filterable content. More particularly, the content associated with each of the stereo images is made distinguishable in the composite image using polarization and/or different color channels. As a result, the content for each image can be filtered out by using a corresponding polarization and/or color filter. Generating a single composite image that includes the content of both stereo images in a manner that the content for each image can be isolated or filtered out enables both images to be presented to the image sensors 104, 106 simultaneously.

At block 616, the example display interface 502 provides the composite image to the display screen 108 for presentation. At block 618, the calibration controller 516 causes the image sensors 104, 106 to capture images of the display screen. In this example, it is assumed that a different optical filter is placed in front of each image sensor 104, 106 to filter out the content associated with the image not intended for the corresponding image sensor. As a result, each image sensor 104, 106 will only capture the content in the composite image corresponding to the particular stereo image intended for that image sensor. At block 620, the example calibration controller obtains depth information generated based on the captured images. In some examples, the depth information is generated and provided by the depth analyzer 110.

In some examples, the content of the stereo images is isolated for each intended image sensor 104, 106 through temporal separation. In such examples, the synthesis of the images at block 614 may be omitted. Further, rather than providing the resulting composite image for display at block 616, the example calibration controller 516 controls the presentation of the separate stereo images at separate times. As a result, the image sensors 104, 106 similarly capture images of the display screen (block 618) at different times. In such examples, substantially real-time processing of the captured images by the depth analyzer 110 may not be possible. Accordingly, in some examples, the image analyzer 510 may generate the depth information associated with block 620 during post-processing.

At block 622, the example calibration controller 516 determines whether error in the depth information is within an error threshold. In some examples, the error is based on a difference between the depth information obtained at block 620 and the depth information defined at block 610. The error threshold may be any suitable value. In some examples, the threshold is zero thereby requiring the error to be zero to satisfy the threshold. If the error is not within the error threshold, control advances to block 624 where the example calibration controller 516 determines whether to adjust the calibration parameters and repeat the process. In some examples, this determination is based on how long the calibration process has been ongoing without converging to an accurate output (e.g., without the error reducing to within the error threshold). If the process is to repeat (output of block 624 is YES), control advances to block 626 where the example calibration controller 516 adjusts calibration parameters based on the error. Thereafter, control returns to block 612 to generate new stereo images (based on the adjusted calibration parameters) to retest the image sensors 104, 106 (using the same depth and viewing angle information as in the previous iteration of the process). Returning to block 624, if the error does not reduce to an acceptable amount (e.g., within the error threshold) within a threshold amount of time (and/or a threshold number of iterations through the calibration process), the example calibration controller may determine (at block 624) to not continue to the calibration process (output of block 624 is NO). In some such examples, the example calibration controller 516 may cause a notification to a user to indicate that the calibration process has failed. Thereafter, control advances to block 628.

Returning to block 622, if the error in the depth information is within the error threshold, control advances directly to block 628 where the example calibration controller 516 determines whether to test with different depths and/or different viewing angles. If so, control returns to block 610 to retest the image sensors 104, 106 using new depth and viewing angle information. Thus, as can be seen, any number of targets may be tested at any desired depth and at any suitable viewing angle with no cumbersome processes to reposition the targets or otherwise adjust the system between the different targets being tested and/or switch between multiple test stations. If no different targets are to be tested, control advances to block 630. In some examples, the calibration controller 516 may determine to not test different targets (at block 628) because there are no more targets to be tested and/or because a previous test failed to converge to an acceptable level of error (as determined at block 624 discussed above). At block 630, the example depth sensing calibrator 112 determines whether there is another depth sensing system to calibrate. If so, control returns to block 602 to repeat the process. Otherwise, the example process of FIG. 6 ends.

Figure 7:
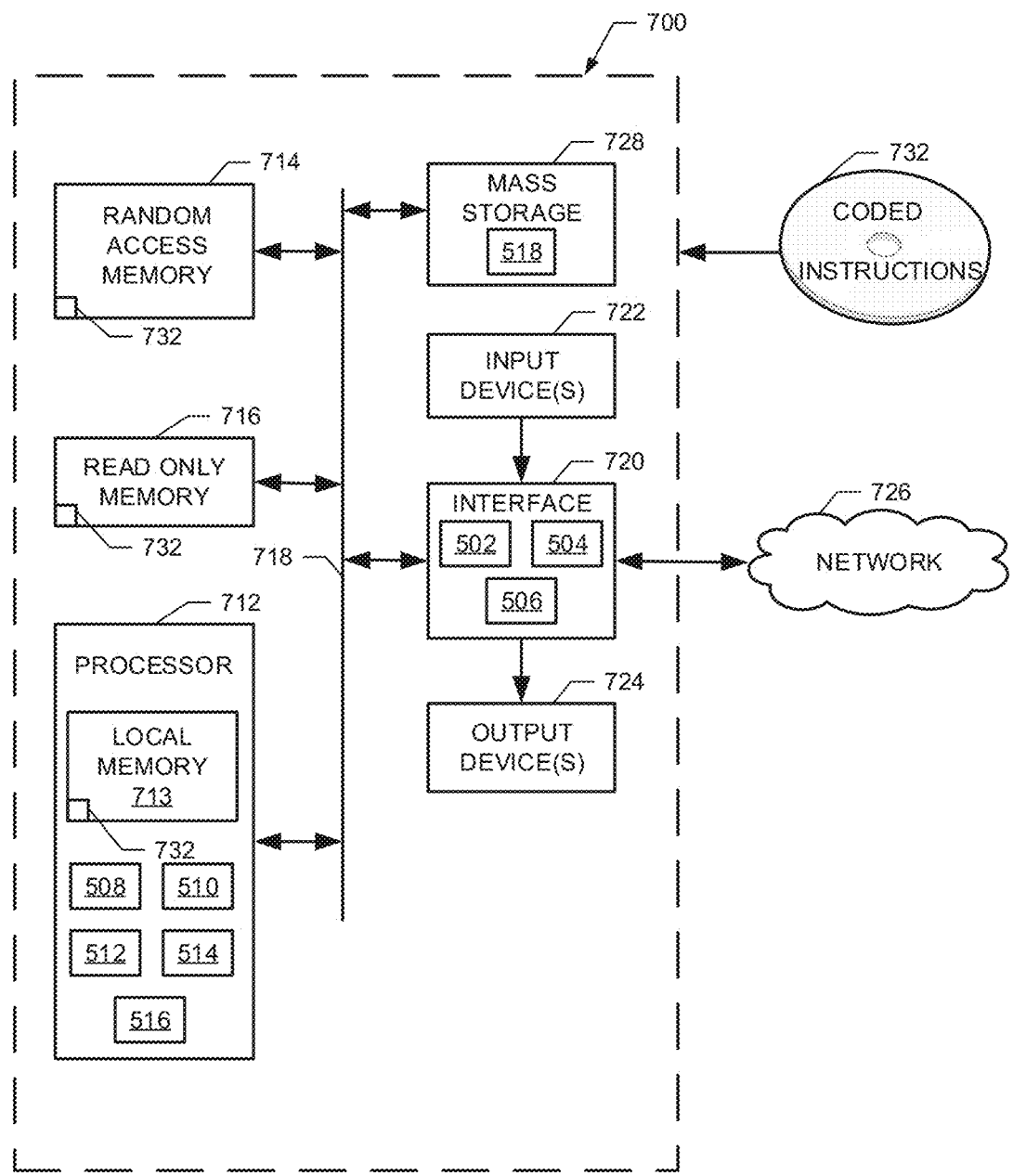
FIG. 7 is a block diagram of an example processing platform structured to execute the instructions of FIG. 3 to implement the example depth sensing calibrator of FIGS. 1 and/or 5.

FIG. 7 is a block diagram of an example processor platform 700 structured to execute the instructions of FIG. 6 to implement the depth sensing calibrator 112 of FIGS. 1 and/or 5. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example alignment controller 508, the example image analyzer 510, the example image generator 512, the example image synthesizer 514, and the example calibration controller 516.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS& Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface. In this example, the interface circuit implements the example display interface 502, the example sensor interface 504, and the example user interface 506.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

Figure 8:
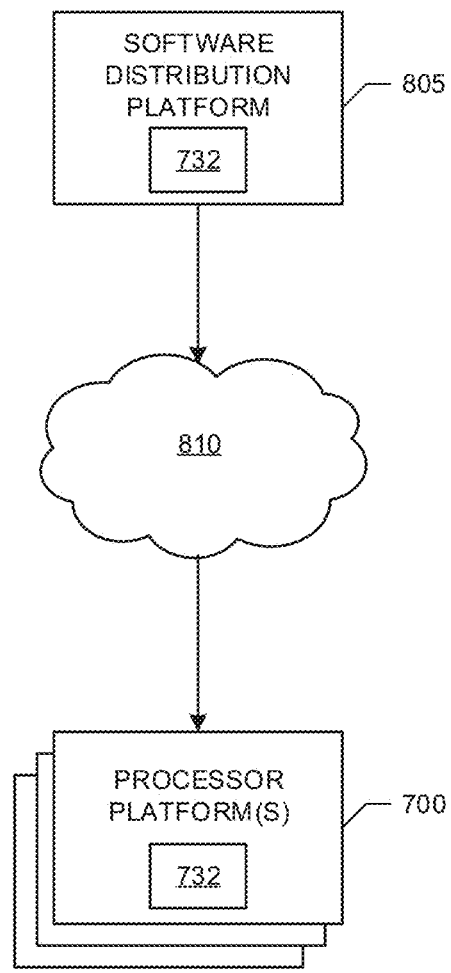
FIG. 8 is a block diagram of an example software distribution platform to distribute software (e.g., software corresponding to the example computer readable instructions of FIG. 6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/ or license the software for use and/or re-sale and/or sub-licensing. In the illustrated example, the software distribution platform 805 includes one or more servers and one or more storage devices. The storage devices store the computer readable instructions 732, which may correspond to the example computer readable instructions of FIGS. 6, as described above. The one or more servers of the example software distribution platform 805 are in communication with a network 810, which may correspond to any one or more of the Internet and/or any of the example networks 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions of FIG. 6, may be downloaded to the example processor platform 700, which is to execute the computer readable instructions 732 to implement the depth sensing calibrator 112. In some example, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

From the foregoing, it will be appreciated that example methods, apparatus and articles of manufacture have been disclosed that that enable the calibration and/or recalibration and/or validation of stereoscopic-based depth sensing system using significantly less space that other existing methodologies. Further, the calibration techniques disclosed herein can run multiple calibration tests for different targets at any suitable depth and any suitable viewing angle without the need to manual reposition the targets or otherwise adjust the system. This saves significant amounts of time to enable more accurate tests to be performed in a given time period, thereby enabling higher quality results. Furthermore, these advantages are available to original design manufacturers as well as other entities (e.g., end users) of stereoscopic depth sensing systems.

Example 1 includes an apparatus comprising an image generator to generate a first image for a first image sensor based on a position and orientation of a display screen relative to the first image sensor, and generate a second image for a second image sensor based on the position and orientation of the display screen relative to the second image sensor, first content in the first image to be shifted relative to corresponding second content in the second image by a shift amount, the shift amount based on a target depth to be tested, and a calibration controller to cause the first and second images to be presented on the display screen, and calibrate the first and second image sensors based on a difference between the target depth and a measured depth, the measured depth based on an analysis of the first and second images as captured by the first and second image sensors when the first and second images are presented on the display screen.

Example 2 includes the apparatus of example 1, further including an image synthesizer to synthesize the first and second images into a composite image to enable the first and second images to be presented simultaneously on the display screen, the first content and the second content represented in the composite image so as to enable one of the first content or the second content to be isolated by filtering out the other one of the first content or the second content.

Example 3 includes the apparatus of example 2, wherein the first content is represented in the composite image with a first color, and the second content is represented in the composite image with a second color different than the first color, the first image sensor to capture the composite image presented on the display screen through a first filter associated with the first color, the second image sensor to capture the composite image presented on the display screen through a second filter associated with the second color.

Example 4 includes the apparatus of example 2, wherein the first content is represented in the composite image with a first polarization, and the second content is represented in the composite image with a second polarization different than the first polarization, the first image sensor to capture the composite image presented on the display screen through a first filter associated with the first polarization, the second image sensor to capture the composite image presented on the display screen through a second filter associated with the second polarization.

Example 5 includes the apparatus of example 1, wherein the first image is presented on the display screen at a different time than the second image.

Example 6 includes the apparatus of example 1, further including an alignment controller to cause an alignment image to be presented on the display screen, and determine the position and orientation of the display screen relative to the first and second image sensors based on an analysis of the alignment image as captured by the first and second image sensors when the alignment image is presented on the display screen.

Example 7 includes the apparatus of example 1, wherein the first and second image sensors are included in a stereoscopic camera.

Example 8 includes the apparatus of example 1, wherein the first content includes a first target, and the second content includes a second target complementary to the first target, a first position of the first target in the first image shifted relative to a second position of the second target in the second image by the shift amount, the first and second targets to resolve to a single virtual target at the target depth.

Example 9 includes the apparatus of example 1, wherein the first content includes a projection pattern.

Example 10 includes the apparatus of example 9, wherein the projection pattern is based on a captured image of a pattern projected by a projector associated with the first and second image sensors.

Example 11 includes the apparatus of example 1, wherein the target depth is a first target depth, the measured depth is a first measured depth, and the shift amount is a first shift amount, the image generator is to generate a third image for the first image sensor, and generate a fourth image for the second image sensor, third content in the first image to be shifted relative to corresponding fourth content in the second image by a second shift amount, the second shift amount based on a second target depth different than the first target depth, and the calibration controller is to cause the third and fourth images to be presented on the display screen, and calibrate the first and second image sensors based on a difference between the second target depth and a second measured depth.

Example 12 includes the apparatus of example 1, wherein the target depth is farther than a distance between the first image sensor and the display screen.

Example 13 includes the apparatus of example 1, wherein the target depth is less than a distance between the first image sensor and the display screen.

Example 14 includes an apparatus comprising at least one memory including instructions, and at least one processor to execute the instructions to generate a first image for a first image sensor based on a position and orientation of a display screen relative to the first image sensor, generate a second image for a second image sensor based on the position and orientation of the display screen relative to the second image sensor, first content in the first image to be shifted relative to corresponding second content in the second image by a shift amount, the shift amount based on a target depth to be tested, cause the first and second images to be presented on the display screen, and calibrate the first and second image sensors based on a difference between the target depth and a measured depth, the measured depth based on an analysis of the first and second images as captured by the first and second image sensors when the first and second images are presented on the display screen.

Example 15 includes the apparatus of example 14, further including an image synthesizer to synthesize the first and second images into a composite image to enable the first and second images to be presented simultaneously on the display screen, the first content and the second content represented in the composite image so as to enable one of the first content or the second content to be isolated by filtering out the other one of the first content or the second content.

Example 16 includes the apparatus of example 15, wherein the first content is represented in the composite image with a first color, and the second content is represented in the composite image with a second color different than the first color, the first image sensor to capture the composite image presented on the display screen through a first filter associated with the first color, the second image sensor to capture the composite image presented on the display screen through a second filter associated with the second color.

Example 17 includes the apparatus of example 15, wherein the first content is represented in the composite image with a first polarization, and the second content is represented in the composite image with a second polarization different than the first polarization, the first image sensor to capture the composite image presented on the display screen through a first filter associated with the first polarization, the second image sensor to capture the composite image presented on the display screen through a second filter associated with the second polarization.

Example 18 includes the apparatus of example 14, wherein the first image is presented on the display screen at a different time than the second image.

Example 19 includes the apparatus of example 14, wherein the at least one processor is to cause an alignment image to be presented on the display screen, and determine the position and orientation of the display screen relative to the first and second image sensors based on an analysis of the alignment image as captured by the first and second image sensors when the alignment image is presented on the display screen.

Example 20 includes the apparatus of example 14, wherein the first and second image sensors are included in a stereoscopic camera.

Example 21 includes the apparatus of example 14, wherein the first content includes a first target, and the second content includes a second target complementary to the first target, a first position of the first target in the first image shifted relative to a second position of the second target in the second image by the shift amount, the first and second targets to resolve to a single virtual target at the target depth.

Example 22 includes the apparatus of example 14, wherein the first content includes a projection pattern.

Example 23 includes the apparatus of example 22, wherein the projection pattern is based on a captured image of a pattern projected by a projector associated with the first and second image sensors.

Example 24 includes the apparatus of example 14, wherein the target depth is a first target depth, the measured depth is a first measured depth, the shift amount is a first shift amount, and the at least one processor is to generate a third image for the first image sensor, generate a fourth image for the second image sensor, third content in the first image to be shifted relative to corresponding fourth content in the second image by a second shift amount, the second shift amount based on a second target depth different than the first target depth, cause the third and fourth images to be presented on the display screen, and calibrate the first and second image sensors based on a difference between the second target depth and a second measured depth.

Example 25 includes the apparatus of example 14, wherein the target depth is farther than a distance between the first image sensor and the display screen.

Example 26 includes the apparatus of example 14, wherein the target depth is less than a distance between the first image sensor and the display screen.

Example 27 includes At least one non-transitory computer readable medium comprising instructions that, when executed, cause at least one processor to at least generate a first image for a first image sensor based on a position and orientation of a display screen relative to the first image sensor, and generate a second image for a second image sensor based on the position and orientation of the display screen relative to the second image sensor, first content in the first image to be shifted relative to corresponding second content in the second image by a shift amount, the shift amount based on a target depth to be tested, cause the first and second images to be presented on the display screen, and calibrate the first and second image sensors based on a difference between the target depth and a measured depth, the measured depth based on an analysis of the first and second images as captured by the first and second image sensors when the first and second images are presented on the display screen.

Example 28 includes the at least one non-transitory computer readable medium of example 27, wherein the instructions cause the at least one processor to synthesize the first and second images into a composite image to enable the first and second images to be presented simultaneously on the display screen, the first content and the second content represented in the composite image so as to enable one of the first content or the second content to be isolated by filtering out the other one of the first content or the second content.

Example 29 includes the at least one non-transitory computer readable medium of example 28, wherein the first content is represented in the composite image with a first color, and the second content is represented in the composite image with a second color different than the first color, the first image sensor to capture the composite image presented on the display screen through a first filter associated with the first color, the second image sensor to capture the composite image presented on the display screen through a second filter associated with the second color.

Example 30 includes the at least one non-transitory computer readable medium of example 28, wherein the first content is represented in the composite image with a first polarization, and the second content is represented in the composite image with a second polarization different than the first polarization, the first image sensor to capture the composite image presented on the display screen through a first filter associated with the first polarization, the second image sensor to capture the composite image presented on the display screen through a second filter associated with the second polarization.

Example 31 includes the at least one non-transitory computer readable medium of example 27, wherein the instructions cause the at least one processor to cause the first image to be presented on the display screen at a different time than the second image.

Example 32 includes the at least one non-transitory computer readable medium of example 27, wherein the instructions cause the at least one processor to cause an alignment image to be presented on the display screen, and determine the position and orientation of the display screen relative to the first and second image sensors based on an analysis of the alignment image as captured by the first and second image sensors when the alignment image is presented on the display screen.

Example 33 includes the at least one non-transitory computer readable medium of example 27, wherein the first content includes a first target, and the second content includes a second target complementary to the first target, a first position of the first target in the first image shifted relative to a second position of the second target in the second image by the shift amount, the first and second targets to resolve to a single virtual target at the target depth.

Example 34 includes the at least one non-transitory computer readable medium of example 27, wherein the first content includes a projection pattern.

Example 35 includes the at least one non-transitory computer readable medium of example 34, wherein the projection pattern is based on a captured image of a pattern projected by a projector associated with the first and second image sensors.

Example 36 includes the at least one non-transitory computer readable medium of example 37, wherein the target depth is a first target depth, the measured depth is a first measured depth, the shift amount is a first shift amount, and the instructions cause the at least one processor to generate a third image for the first image sensor, and generate a fourth image for the second image sensor, third content in the first image to be shifted relative to corresponding fourth content in the second image by a second shift amount, the second shift amount based on a second target depth different than the first target depth, cause the third and fourth images to be presented on the display screen, and calibrate the first and second image sensors based on a difference between the second target depth and a second measured depth.

Example 37 includes a method comprising generating a first image for a first image sensor based on a position and orientation of a display screen relative to the first image sensor, and generating a second image for a second image sensor based on the position and orientation of the display screen relative to the second image sensor, first content in the first image to be shifted relative to corresponding second content in the second image by a shift amount, the shift amount based on a target depth to be tested, causing the first and second images to be presented on the display screen, and calibrating the first and second image sensors based on a difference between the target depth and a measured depth, the measured depth based on an analysis of the first and second images as captured by the first and second image sensors when the first and second images are presented on the display screen.

Example 38 includes the method of example 37, further including synthesizing the first and second images into a composite image to enable the first and second images to be presented simultaneously on the display screen, the first content and the second content represented in the composite image so as to enable one of the first content or the second content to be isolated by filtering out the other one of the first content or the second content.

Example 39 includes the method of example 38, wherein the first content is represented in the composite image with a first color, and the second content is represented in the composite image with a second color different than the first color, the first image sensor to capture the composite image presented on the display screen through a first filter associated with the first color, the second image sensor to capture the composite image presented on the display screen through a second filter associated with the second color.

Example 40 includes the method of example 38, wherein the first content is represented in the composite image with a first polarization, and the second content is represented in the composite image with a second polarization different than the first polarization, the first image sensor to capture the composite image presented on the display screen through a first filter associated with the first polarization, the second image sensor to capture the composite image presented on the display screen through a second filter associated with the second polarization.

Example 41 includes the method of example 37, wherein the first image is presented on the display screen at a different time than the second image.

Example 42 includes the method of example 37, further including causing an alignment image to be presented on the display screen, and determining the position and orientation of the display screen relative to the first and second image sensors based on an analysis of the alignment image as captured by the first and second image sensors when the alignment image is presented on the display screen.

Example 43 includes the method of example 37, wherein the first content includes a first target, and the second content includes a second target complementary to the first target, a first position of the first target in the first image shifted relative to a second position of the second target in the second image by the shift amount, the first and second targets to resolve to a single virtual target at the target depth.

Example 44 includes the method of example 37, wherein the first content includes a projection pattern.

Example 45 includes the method of example 44, wherein the projection pattern is based on a captured image of a pattern projected by a projector associated with the first and second image sensors.

Example 46 includes the method of example 37, wherein the target depth is a first target depth, the measured depth is a first measured depth, the shift amount is a first shift amount, and the method further includes generating a third image for the first image sensor, and generating a fourth image for the second image sensor, third content in the first image to be shifted relative to corresponding fourth content in the second image by a second shift amount, the second shift amount based on a second target depth different than the first target depth, causing the third and fourth images to be presented on the display screen, and calibrating the first and second image sensors based on a difference between the second target depth and a second measured depth.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    an image generator to:
        generate a first image for a first image sensor based on a position and orientation of a display screen relative to the first image sensor; and
        generate a second image for a second image sensor based on the position and orientation of the display screen relative to the second image sensor, first content in the first image to be shifted relative to corresponding second content in the second image by a shift amount, the shift amount based on a target depth to be tested; and
    a calibration controller to:
        cause the first and second images to be presented on the display screen; and
        calibrate the first and second image sensors based on a difference between the target depth and a measured depth, the measured depth based on an analysis of the first and second images as captured by the first and second image sensors when the first and second images are presented on the display screen.

2. The apparatus of claim 1, further including an image synthesizer to synthesize the first and second images into a composite image to enable the first and second images to be presented simultaneously on the display screen, the first content and the second content represented in the composite image so as to enable one of the first content or the second content to be isolated by filtering out the other one of the first content or the second content.

3. The apparatus of claim 2, wherein the first content is represented in the composite image with a first color, and the second content is represented in the composite image with a second color different than the first color, the first image sensor to capture the composite image presented on the display screen through a first filter associated with the first color, the second image sensor to capture the composite image presented on the display screen through a second filter associated with the second color.

4. The apparatus of claim 2, wherein the first content is represented in the composite image with a first polarization, and the second content is represented in the composite image with a second polarization different than the first polarization, the first image sensor to capture the composite image presented on the display screen through a first filter associated with the first polarization, the second image sensor to capture the composite image presented on the display screen through a second filter associated with the second polarization.

5. The apparatus of claim 1, wherein the first image is presented on the display screen at a different time than the second image.

6. The apparatus of claim 1, further including an alignment controller to:
    cause an alignment image to be presented on the display screen; and
    determine the position and orientation of the display screen relative to the first and second image sensors based on an analysis of the alignment image as captured by the first and second image sensors when the alignment image is presented on the display screen.

7. The apparatus of claim 1, wherein the first and second image sensors are included in a stereoscopic camera.

8. The apparatus of claim 1, wherein the first content includes a first target, and the second content includes a second target complementary to the first target, a first position of the first target in the first image shifted relative to a second position of the second target in the second image by the shift amount, the first and second targets to resolve to a single virtual target at the target depth.

9. The apparatus of claim 1, wherein the first content includes a projection pattern.

10. The apparatus of claim 9, wherein the projection pattern is based on a captured image of a pattern projected by a projector associated with the first and second image sensors.

11. The apparatus of claim 1, wherein the target depth is a first target depth, the measured depth is a first measured depth, and the shift amount is a first shift amount;
the image generator is to:
generate a third image for the first image sensor; and
generate a fourth image for the second image sensor, third content in the first image to be shifted relative to corresponding fourth content in the second image by a second shift amount, the second shift amount based on a second target depth different than the first target depth; and
the calibration controller is to:
cause the third and fourth images to be presented on the display screen; and
calibrate the first and second image sensors based on a difference between the second target depth and a second measured depth.

12. The apparatus of claim 1, wherein the target depth is farther than a distance between the first image sensor and the display screen.

13. The apparatus of claim 1, wherein the target depth is less than a distance between the first image sensor and the display screen.

14. An apparatus comprising:
at least one memory including instructions; and
at least one processor to execute the instructions to:
generate a first image for a first image sensor based on a position and orientation of a display screen relative to the first image sensor;
generate a second image for a second image sensor based on the position and orientation of the display screen relative to the second image sensor, first content in the first image to be shifted relative to corresponding second content in the second image by a shift amount, the shift amount based on a target depth to be tested;
cause the first and second images to be presented on the display screen; and
calibrate the first and second image sensors based on a difference between the target depth and a measured depth, the measured depth based on an analysis of the first and second images as captured by the first and second image sensors when the first and second images are presented on the display screen.

15. The apparatus of claim 14, further including an image synthesizer to synthesize the first and second images into a composite image to enable the first and second images to be presented simultaneously on the display screen, the first content and the second content represented in the composite image so as to enable one of the first content or the second content to be isolated by filtering out the other one of the first content or the second content.

16. The apparatus of claim 15, wherein the first content is represented in the composite image with a first color, and the second content is represented in the composite image with a second color different than the first color, the first image sensor to capture the composite image presented on the display screen through a first filter associated with the first color, the second image sensor to capture the composite image presented on the display screen through a second filter associated with the second color.

17. The apparatus of claim 15, wherein the first content is represented in the composite image with a first polarization, and the second content is represented in the composite image with a second polarization different than the first polarization, the first image sensor to capture the composite image presented on the display screen through a first filter associated with the first polarization, the second image sensor to capture the composite image presented on the display screen through a second filter associated with the second polarization.

18. The apparatus of claim 14, wherein the first image is presented on the display screen at a different time than the second image.

19. The apparatus of claim 14, wherein the first content includes a first target, and the second content includes a second target complementary to the first target, a first position of the first target in the first image shifted relative to a second position of the second target in the second image by the shift amount, the first and second targets to resolve to a single virtual target at the target depth.

20. At least one non-transitory computer readable medium comprising instructions to cause at least one processor to at least:
generate a first image for a first image sensor based on a position and orientation of a display screen relative to the first image sensor;
generate a second image for a second image sensor based on the position and orientation of the display screen relative to the second image sensor, first content in the first image to be shifted relative to corresponding second content in the second image by a shift amount, the shift amount based on a target depth to be tested;
cause the first and second images to be presented on the display screen; and
calibrate the first and second image sensors based on a difference between the target depth and a measured depth, the measured depth based on an analysis of the first and second images as captured by the first and second image sensors when the first and second images are presented on the display screen.

21. The at least one non-transitory computer readable medium of claim 20, wherein the instructions cause the at least one processor to synthesize the first and second images into a composite image to enable the first and second images to be presented simultaneously on the display screen, the first content and the second content represented in the composite image so as to enable one of the first content or the second content to be isolated by filtering out the other one of the first content or the second content.

22. The at least one non-transitory computer readable medium of claim 21, wherein the first content is represented in the composite image with a first color, and the second content is represented in the composite image with a second color different than the first color, the first image sensor to capture the composite image presented on the display screen through a first filter associated with the first color, the second image sensor to capture the composite image presented on the display screen through a second filter associated with the second color.

23. The at least one non-transitory computer readable medium of claim 21, wherein the first content is represented in the composite image with a first polarization, and the second content is represented in the composite image with a second polarization different than the first polarization, the first image sensor to capture the composite image presented on the display screen through a first filter associated with the first polarization, the second image sensor to capture the composite image presented on the display screen through a second filter associated with the second polarization.

24. The at least one non-transitory computer readable medium of claim 20, wherein the instructions cause the at least one processor to cause the first image to be presented on the display screen at a different time than the second image.

25. The at least one non-transitory computer readable medium of claim 20, wherein the first content includes a first target, and the second content includes a second target complementary to the first target, a first position of the first target in the first image shifted relative to a second position of the second target in the second image by the shift amount, the first and second targets to resolve to a single virtual target at the target depth.

\* \* \* \* \*